United States Patent [19]

Cory

[11] Patent Number: 5,501,179
[45] Date of Patent: Mar. 26, 1996

[54] INDOOR HOUSEHOLD ANIMAL DETERRENT DEVICE

[76] Inventor: George J. Cory, 230 W. Arroya Ave., Ajo, Ariz. 85321

[21] Appl. No.: 236,546

[22] Filed: May 2, 1994

[51] Int. Cl.$^6$ ................................................ A01K 15/00
[52] U.S. Cl. ............................................... 119/712
[58] Field of Search ........................... 119/712, 713, 119/718, 720, 174; 340/573; 239/67, 69

[56] References Cited

U.S. PATENT DOCUMENTS

| | | | |
|---|---|---|---|
| 4,627,385 | 12/1986 | Vinci | 119/718 |
| 5,009,192 | 4/1991 | Burman | 119/720 |

*Primary Examiner*—Thomas Price
*Attorney, Agent, or Firm*—Laura J. Zeman

[57] ABSTRACT

A battery operated device for indoor use in deterring domesticated animals from approaching or climbing on an object. The device incorporates a sensor which senses the approach of the animal and relays a signal to a motor, thus activating the pump to deliver the fluid contained within a reservoir to a mist sprayer. The device delivers the fluid in a misting manner coming in contact with the approaching animal, so as to not damage any indoor furnishings. The sensing mechanism is of the type capable of detecting the presence of a magnetic field, of detecting the animal through the elevated temperature of the animal or the detecting the approach of the animal within a certain proximity to the sensor. The device remains undetectable to the approaching animal and thus the animal is unable to associate the device with the offensive spray of fluid.

20 Claims, 2 Drawing Sheets

INDOOR HOUSEHOLD ANIMAL DETERRENT DEVICE

FIELD OF THE INVENTION

This invention relates to a device and a method for deterring household animals from approaching, destroying or climbing on indoor furniture or the like. This indoor household animal deterrent device is based on the principle of scaring or obtaining an animal's attention, thus deterring the animal, by spraying a fine mist of water in its direction with the animal unable to detect the means for delivery of the spray mist.

BACKGROUND OF THE INVENTION

Domestic animals such as dogs and cats, etc. have been known to cause harm to indoor furnishings, plants and the like by scratching, laying upon and in general having access to such objects. There is a present need for an inexpensive device for indoor use which upon sensing the approach of an animal, generates a spray mist of water in the direction of an approaching animal, thus scaring it away from the object sought to be protected, without detection by the animal of the means for delivering the offensive spray mist of water. The device is capable of scaring an animal away from an object without causing harm to the animal or the surrounding indoor environment. The device is designed to be small in size and capable of being hidden out of the sight of the animal sought to be deterred. In addition, the delivery of water to deter the animal is of a significant amount to alert the animal, but not so much as to damage indoor coverings, such as fabric, carpet, tile, wood or the like.

For many years, experts in animal training have thought to use a device which shoots water directly at an animal to deter it from approaching an object sought to be protected. In particular, many individuals have tried using toy guns and spray bottles which shoot water directly at the approaching animal. Over time, the animal learns to associate the object which shoots the water, i.e. the toy gun or spray bottle, with the deterring water and the human actuating the toy gun or spray bottle. The animal will then learn to recognize the presence of the toy gun or spray bottle and the human prior to approaching the object. If the presence of the toy gun or spray bottle and the human or other source of water is not noted by the animal, the animal will not be deterred and proceed to the unprotected object. Another problem associated with the use of toy guns, spray bottles and water is that they tend to damage surrounding furnishings due to the consolidated stream of water emitted from the toy gun or spray bottle and the quantity of water emitted. Accordingly, there exists a need for a device which is capable of going undetected by an animal, so as to lack the association with the means for deterring, without damaging surrounding furnishings.

The present deterrence device comprises a means for sensing the approach of a domesticated animal, such as a cat or a dog, in an indoor environment. The preferred sensor is an infrared motion sensor. The motion sensor can be set to a predetermined mode and beam width dependent upon the area sought to be protected. This adjustment is accomplished through the various use of lenses. Upon detection of movement in the particular area monitored, the pump/motor assembly is activated and a spray of water is delivered in the direction of the animal.

In a second alternative embodiment of the invention, a temperature sensor is utilized. It is a well known fact that the average normal human body temperature is 98.6°. According to experts in the field of animal care, the average normal temperature of a domesticated animal, such as a cat or a dog, averages between 100.5° to 102°. Accordingly, dependent on the type of animal sought to be kept away from a particular object and its average temperature, a temperature sensor having a predetermined sensing degree may be used. The sensor operates by detecting an animal within its sensing area having an elevated temperature. Once detected, the sensor activates the motor/pump assembly and a spray of water is delivered in the direction of the animal.

In a third alternative embodiment of the invention, a Hall-effect metal/magnetic sensor type is utilized. The Hall-effect sensor detects the presence or absence of a magnet or metal surface. The sensor is activated by placing a collar containing a small magnet around the animal's neck. When the animal comes within close proximity to the sensor, so as to move the magnet in front of the sensor, an output activates a relay that signals the motor to activate the pump, thus delivering a spray of water in the direction of the approaching animal.

Included with the disclosure of the invention, is a means for remotely activating the device. Remote activation may be sought in the instance where the sensing means is not used, yet activation of the device remains a need. Such remote activation may be in the form of the commonly known infrared transmitting device or radio frequency transmitting device.

Included within today's present patent literature are various means for deterring animals either through the delivery of water or noise. U.S. Pat. No. 5,009,192, issued to Burman in 1991, discloses an animal deterrent apparatus. The Burman device is designed for the deterrence of animals in outdoor locations such as fields, gardens and nurseries. The device operates by sensing the approach of an animal within a predetermined distance and upon doing so activates an outdoor water sprinkler. The sprinkler is connected to a water supply such as the typical outdoor water spout. In addition, the apparatus as taught utilizes a pulsating sprinkler which incorporates a pulsating hissing noise to further deter the animal away from the garden, field or nursery. The apparatus upon detection of the presence of an animal through an infrared motion detector, activates a solenoid valve, thus delivering a sudden jet of water in the general direction of the intruding animal. The jet of water may or may not come in actual contact with the animal.

U.S. Pat. No. 5,214,411, issued to Herbruck in 1993, discloses an ultrasonic animal repelling apparatus. The apparatus is operational when an animal is detected by an infrared sensing detector. The unit is portable in nature and capable of being easily moved for placement in the area in which deterrence of animals is necessary. The apparatus is comprised of a reflector cone, ultrasonic emitter, sound emitting electronics and a means for detecting the approach of an animal. Once detected, the unit activates the ultrasonic emitter, emitting a sound undetectable by humans, but detectable and offensive to animals. The concept behind this patent is simply to provide for ease of deterring animals with a portable device, which deters animal in a manner which is undetectable by humans, yet detectable by animals.

U.S. Pat. No. 4,969,418, issued to Jones in 1990 discloses an animal training system which is based on the delivery of an electrical shock to the animal when it treads on a visible interdigital array mat. Specifically, the device is disclosed as being utilized where the deterrence of an animal's passage along a pathway is sought. The device is comprised of an insulating mat with contained electrodes. When the animal steps on the device, an electrical shock is delivered to the animal as a means for deterring its passage. In addition, there is a second embodiment which discloses the use of an odor which can be incorporated into the design of the mat and emitted upon the receipt of pressure by the animal's weight. Finally, the use of ultrasonic sound is disclosed as a third embodiment in the delivery of a deterring means with the mat.

U.S. Pat. No. 5,168,831, issued to Ittershagen et al. discloses a tacky surface animal repeller. The system as disclosed is dependent upon the positioning and placement of a tacky material in the area in which deterrence of the animal is sought. The animal in time learns to recognize the tacky material as being offensive, and stays away from the area sought to be protected.

U.S. Pat. No. 5,024,183, issued to Baer, discloses another animal training device. The device as disclosed is an adaptation of the typical mouse trap. The system incorporates with the mouse trap a flapper which upon activation, startles the animal while making a noise and striking the animal. The device is activated by the animal during what is considered inappropriate behavior. This patent is cited as yet another means for training animals to stay away from a particular area by startling the animal with noise.

The current patent literature provides for various types of animal deterrent devices, yet fails to provide for an indoor animal deterrent device which incorporates the use of specialized sensors, a motor and pump assembly, a water reservoir and a means for delivering a fine spray mist of water in the direction of the approaching animal. In addition, the present patent literature fails to provide for a device which operates under the premise of remaining undetected by the animal.

SUMMARY OF THE INVENTION

Accordingly, it is a broad aspect of the present invention to provide for a device capable of deterring an animal away from an object sought to be protected from the animal.

It is a further object of the present invention to provide for a device capable of actuation without the presence of human intervention or in the alternative, actuation by a human when the need arises.

It is a further object of the present invention to provide for a means for deterring animals through the use of a fine spray mist of water capable of being delivered without damaging indoor furnishings or indoor surfaces.

It is a still further object of the present invention to provide for a device for deterring animals which is undetectable by the animal so as to render the animal unable to associate the means for deterring with a specific device.

These and other objects, features and advantages of the present invention will become more apparent to those skilled in the art from the following more detailed description of the preferred embodiment of the invention taken with reference to the accompanying Figures.

DETAILED DESCRIPTION OF THE PREFERRED EMBODIMENT

Figure 1A:
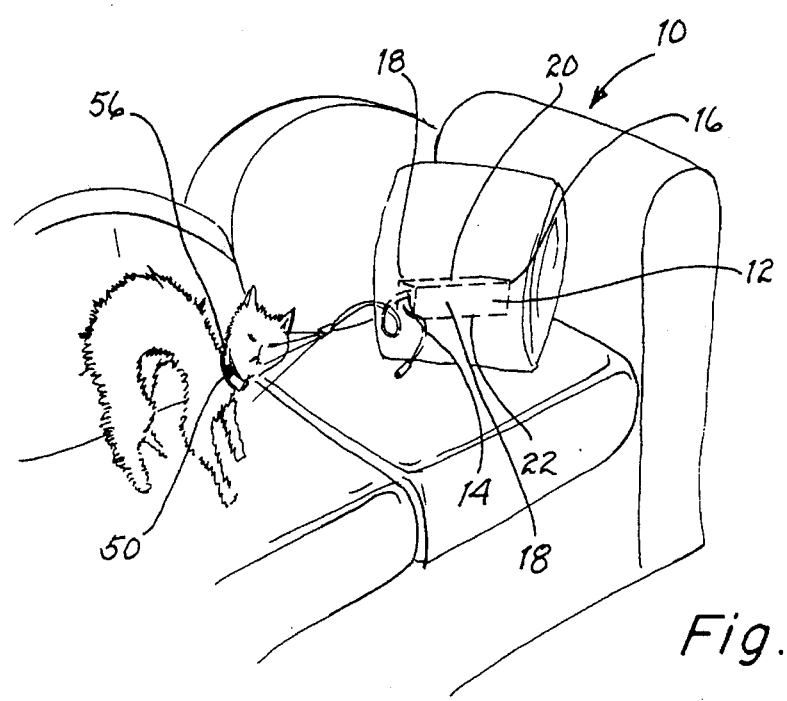
FIG. 1A is a perspective view of the device as taught by the instant invention showing placement within a typical object sought to be protected.
Figure 1:
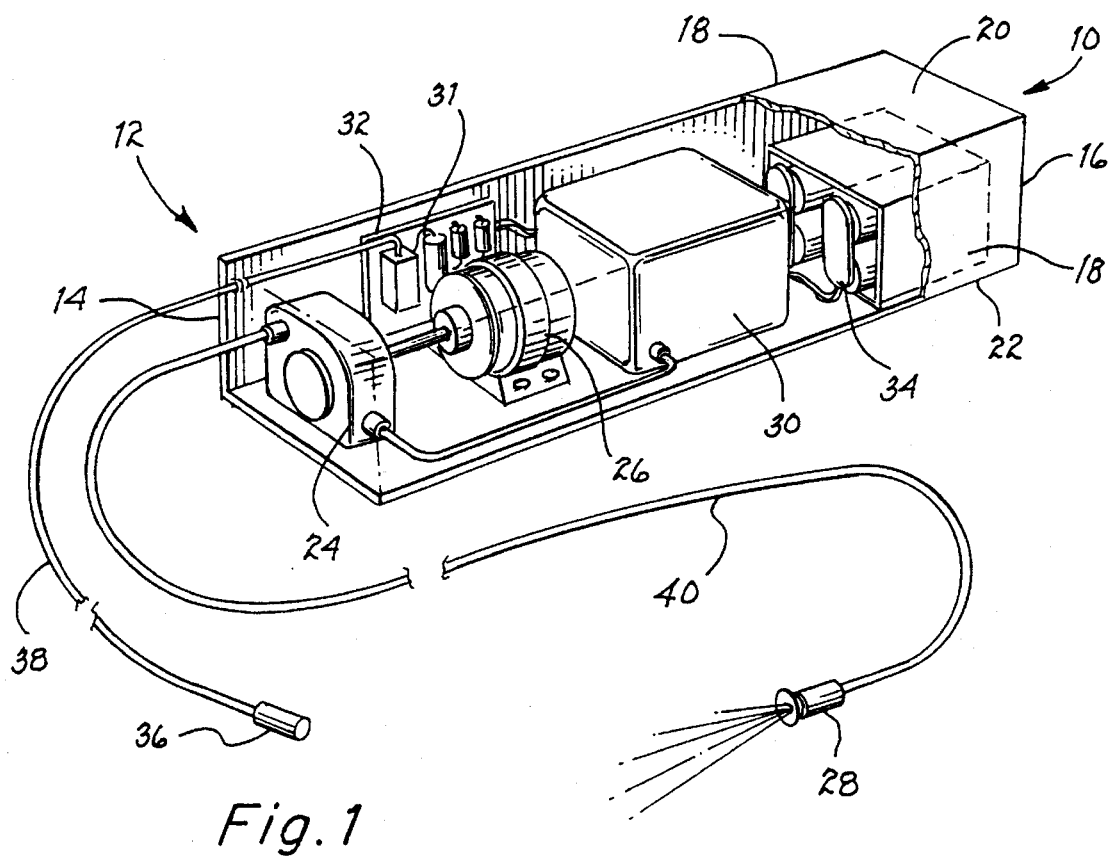
FIG. 1 is a perspective view of the device, showing in schematic representation, the elements as taught by the instant invention having an interior battery source and water reservoir.

Referring particularly to the drawings, there is shown the elements of the device of the present invention. In FIG. 1A, there is shown the animal deterrent device 10 positioned within or near a typical object sought to be protected. As schematically shown in FIG. 1, the device is comprised of a housing 12 for the device 10 which serves to hold the mechanical and electrical components of the present invention. The housing 12 is substantially rectangular in form and has a plurality of faces, typically a forward face 14, a rear face 16, two oppositely disposed side faces 18, a top face 20 and a bottom face 22. Enclosed within the housing 12 is a pump 24, a motor 26, a water reservoir 30 and associated control circuitry 31. There is provided connection line 40 which serves to connect a water mist sprayer 28 through one of the faces of the housing 12 with the pump 24 and water reservoir 30 in fluid flow communication. The connection line 40 is preferably made of a vinyl tubing and provided in standard lengths or, alternatively, one long length of tubing may be provided in a rolled or other prepackaged form to enable a user to measure and cut the desired length of tubing needed for positioning the deterrent device in association with a particular object sought to be protected. Within at least one of the faces, there is provided an on/off switch (not shown). Electrical power is supplied to the deterrent device by means of a battery source 34. The preferred battery source provides from 6–12 volts of power and capable of being enclosed within the housing 12 or in the alternative, in an exterior self housing unit. A sensing device 36 is provided in electrical communication with the motor 26. The sensing device 36 is of the type which is capable of detecting the presence of the approaching animal either by means of infrared motion detection, temperature sensing or presence of a magnetic field. In one embodiment, a collar 56, with a permanent magnet 50 incorporated therein, is disposed about an animal's neck. When the permanent magnet 50 is in close proximity to a current-carrying conductor sensor 36, a transverse voltage is developed in the sensor 36 in accordance with the Hall effect. The voltage is caused by the deflection of charge carriers by the magnetic field. The voltage actuates a control circuitry 31. When the sensor senses the approach of an animal, it sends a relay output to the motor 26 which activates the pump 24, thus delivering water from the water reservoir 30 through the connection line 40 to the water mist sprayer 28.

The sensing device 36 is of the type which detects the presence of an approaching animal by motion detection, temperature or magnetic field detection. A low voltage electric line 38 connects the sensor to the housing 12 through one of the faces of the housing 12. Upon detection of an animal the sensing device 36 sends a signal to the motor 26 which activates the pump 24 to pump water from the water reservoir 30 through the connection lines 40 to the water mist sprayer 28. The water reservoir 30 is capable of holding only a small amount of water so as not to damage any furnishings and to allow the reservoir 30 to remain small in size. The water reservoir 30 is positioned within the housing 12 or in the alternative, exterior to housing 12 of the device 10. Once the animal leaves the area in which the sensing device 36 is set to monitor, the relay signal from the sensing device 36 ceases and the motor 26 is turned off. In the alternative, a timer can be provided to limit the spray of water to be between 1–2 seconds, prior to deactivation. Once the motor 26 is signaled to turn off, the pump 24 is deactivated and the delivery of water ceases. There is provided an on/off switch 32 for deactivating the power source when operation of the device is not desired.

The device 10 when in use is placed within or in close proximity to the object sought to be protected. The housing 12 is of a size so as to be discreetly placed within, under or near said object. The sensing device 36 and water spray mister 28 are positioned at the outermost edge of the object, yet remaining in a position so as to not be detected by the animal. When the animal's presence is detected, the device 10 is activated and delivers a spray of water in the general direction of the animal. The animal in turn is scared away from the object without detecting the source of the water and the device 10 is deactivated.

Figure 2:
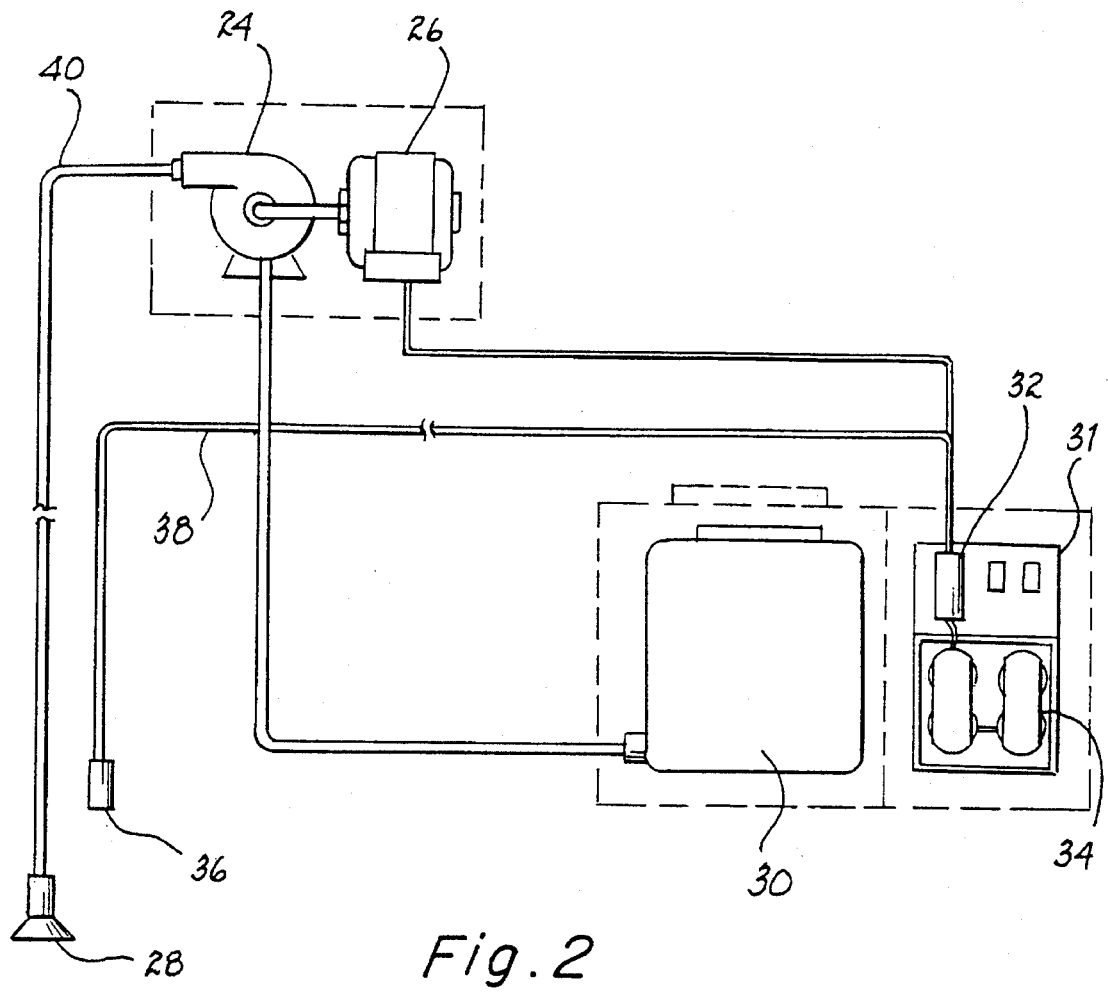
FIG. 2 is a schematic view of the device, showing in schematic representation, the elements as taught by the instant invention.

Referring now to FIG. 2, shown is a schematic view of the device, showing in schematic representation, the elements as taught by the instant invention. Shown is the battery source 34 which is in electrical communication with the control circuitry 31, the motor 26, the pump 24 and the sensing device 36. Shown in fluid flow communication through connection line 40 are the fluid reservoir 30 and the water mist sprayer 28.

Provided as alternative embodiments of the present invention, it is disclosed to house the batteries and/or water reservoir exterior the housing 12 of the device 10. In addition, it is disclosed to provide remote activation of the device 10. This remote activation can be accomplished through typical remote signaling means, such as in the form of infrared signaling or radio frequency signaling.

It will be apparent to those skilled in the art, that the foregoing detailed description of the preferred embodiment of the present invention is representative of a type of animal deterrent device for indoor use, within the scope and spirit of the present invention. Further, those skilled in the art will recognize that various changes and modifications may be made without departing from the true spirit and scope of the present invention. Those skilled in the art will recognize that the invention is not limited to the specifics as shown here, but is claimed in any form or modification falling within the scope of the appended claims. For that reason, the scope of the present invention is set forth in the following claims.

I claim:

1. An indoor animal deterrent device comprising:

a housing member;

a motor enclosed within said housing member;

a pump enclosed within said housing member, in electrical communication with said motor;

a means for delivering a spray mist of fluid, in fluid flow communication with said pump;

at least one fluid reservoir in fluid flow communication with said pump and said means for delivering said mist of water;

a means for sensing an approach of an animal, in electrical communication with said motor, thereby capable of relaying an electrical signal to said motor; and a battery source for supplying an electrical current to said deterrent device.

2. The animal deterrent device according to claim 1, wherein said fluid reservoir is enclosed within said housing.

3. The animal deterrent device according to claim 1, wherein said battery source is enclosed within said housing and having provided a switch for turning on and off the electrical current to the device positioned on said housing.

4. The animal deterrent device according to claim 1, wherein said battery source is capable of delivering between 6–12 volts of power.

5. The animal deterrent device according to claim 1, wherein said means for sensing is comprised of at least one of a proximity and motion infrared sensor capable of detecting at least one of approach and movement of an animal.

6. The animal deterrent device according to claim 1, wherein said means for sensing is comprised of a temperature sensor capable of sensing a predetermined temperature.

7. The animal deterrent device according to claim 1, wherein said means for sensing is comprised of a Hall-effect sensor capable of detecting the presence of a magnetic field.

8. The animal deterrent device according to claim 7, wherein said magnetic field is supplied by a magnet disposed about an animal's neck.

9. The animal deterrent device according to claim 8, wherein said magnet disposed about an animal's neck is comprised of an animal collar having a magnet disposed within said collar.

10. The animal deterrent device according to claim 8, wherein said magnet disposed about an animal's neck is comprised of an animal collar having a magnet attached to said collar.

11. An indoor animal deterrent device comprising:

a housing member having a plurality of faces;

a motor enclosed within said housing member;

a pump enclosed within said housing member, in electrical communication with said motor;

a means for delivering a spray mist of fluid, in fluid flow communication with said pump;

at least one fluid reservoir in fluid flow communication with said pump and means for delivering said spray mist of fluid;

an infrared motion sensor capable of detecting the presence of a moving object in electrical communication with said motor, thereby capable of relaying an electrical signal to said motor upon the detection of movement; and a battery source for supplying an electrical flow to said deterrent device enclosed within said housing member.

12. The animal deterrent device according to claim 11, wherein said battery source is enclosed within said housing.

13. The animal deterrent device according to claim 11, wherein said at least one fluid reservoir is enclosed within said housing.

14. An indoor animal deterrent device comprising:

a housing member having a plurality of faces;

a motor enclosed within said housing member;

a pump enclosed within said housing member, in electrical communication with said motor;

a means for delivering a spray mist of fluid, in fluid flow communication with said pump;

at least one fluid reservoir in fluid flow communication with said pump and means for delivering said spray mist of fluid;

a temperature sensor capable of detecting the presence of a predetermined temperature in electrical communication with said motor, thereby capable of relaying an electrical signal to said motor upon the detection of said temperature; and a battery source for supplying an electrical flow to said deterrent device enclosed within said housing member.

15. The animal deterrent device according to claim 14, wherein said battery source is enclosed within said housing.

16. The animal deterrent device according to claim 14, wherein said at least one fluid reservoir is enclosed within said housing.

17. An indoor animal deterrent device comprising:

a housing member having a plurality of faces;

a motor enclosed within said housing member;

a pump enclosed within said housing member, in electrical communication with said motor;

a means for delivering a spray mist of fluid, in fluid flow communication with said pump;

at least one fluid reservoir in fluid flow communication with said pump and means for delivering said spray mist of fluid;

a Hall-effect sensor capable of detecting the presence of a magnetic field in electrical communication with said motor, thereby capable of relaying an electrical signal to said motor; and a battery source for supplying an electrical flow to said deterrent device enclosed within said housing member.

18. The animal deterrent device according to claim 17, wherein said battery source is enclosed within said housing.

19. The animal deterrent device according to claim 17, wherein said at least one fluid reservoir is enclosed within said housing.

20. The method of deterring indoor animals from objects comprising the steps of:

positioning a housing member having enclosed within a pump and a motor;

positioning a means for sensing near the object sought to be protected from an approach of an animal;

positioning a means for delivering a spray mist of fluid to said animal;

sensing the approach of said animal, thereby signaling said motor to activate said pump to deliver the fluid contained within a water reservoir to a means for mist spraying the fluid in the direction of said approaching animal;

spraying a mist of said fluid from a mist sprayer, scaring said approaching animal, thereby deterring said animal away from said object sought to be protected; and sensing the retreat of said animal, thereby ceasing to signal said motor and said pump to deliver the spray mist of fluid to the animal.

* * * * *